US011022037B2

(12) United States Patent
Niergarth et al.

(10) Patent No.: US 11,022,037 B2
(45) Date of Patent: Jun. 1, 2021

(54) GAS TURBINE ENGINE THERMAL MANAGEMENT SYSTEM

(71) Applicant: General Electric Company, Schenectady, NY (US)

(72) Inventors: Daniel Alan Niergarth, Norwood, OH (US); Brandon Wayne Miller, Liberty Township, OH (US); Raymond Floyd Martell, Wyoming, OH (US); Jeffrey Douglas Rambo, Mason, OH (US); Ryan James Matthys, South Lebanon, OH (US); Joel Francis Kirk, Monroe, OH (US)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 15/861,802

(22) Filed: Jan. 4, 2018

(65) Prior Publication Data
US 2019/0203644 A1    Jul. 4, 2019

(51) Int. Cl.
*F02C 7/143* (2006.01)
*F01D 5/14* (2006.01)
(Continued)

(52) U.S. Cl.
CPC .............. *F02C 7/143* (2013.01); *F01D 5/142* (2013.01); *F01D 5/085* (2013.01); *F01D 9/065* (2013.01);
(Continued)

(58) Field of Classification Search
CPC ............... F02C 7/143; F05D 2260/211; F05D 2240/81; F05D 2260/204; F05D 2260/207;
(Continued)

(56) References Cited

U.S. PATENT DOCUMENTS 2,582,842 A    1/1952 Messinger
3,719,047 A *  3/1973 Briotet ..................... F02K 1/17
                                                    60/239
(Continued)

FOREIGN PATENT DOCUMENTS

EP    2003311 A2    12/2008
GB    2136880 A      9/1984
(Continued)

OTHER PUBLICATIONS

General Electric, image of the STIG-equipped aeroderivative engine LM6000PC, 2010-2011, retrieved from https://www.ccj-online.com/western-turbine-users-2010-2011-meeting/nggallery/thumbnails on Apr. 16, 2020 (Year: 2011).*

(Continued)

*Primary Examiner* — Gerald L Sung
*Assistant Examiner* — Stephanie Sebasco Cheng
(74) *Attorney, Agent, or Firm* — Dority & Manning, P.A.

(57) ABSTRACT

A gas turbine engine includes a turbomachine including a compressor section, a combustion section, a turbine section, and an exhaust section arranged in serial flow order and together defining at least in part a core air flowpath. The gas turbine engine also includes a thermal management system including a flowpath heat exchanger coupled to, or integrated into, one or more components of the compressor section, the combustion section, the turbine section, or the exhaust section such that the flowpath heat exchanger is directly thermally coupled to an airflow through the core air flowpath.

7 Claims, 9 Drawing Sheets

(51) Int. Cl.
*F02C 7/18* (2006.01)
*F01D 25/12* (2006.01)
*F02C 7/12* (2006.01)
*F01D 5/08* (2006.01)
*F02C 3/06* (2006.01)
*F23R 3/28* (2006.01)
*F01D 9/06* (2006.01)

(52) U.S. Cl.
CPC ............... *F01D 25/12* (2013.01); *F02C 3/06* (2013.01); *F02C 7/12* (2013.01); *F02C 7/185* (2013.01); *F05D 2220/3216* (2013.01); *F05D 2240/12* (2013.01); *F05D 2260/213* (2013.01); *F23R 3/283* (2013.01)

(58) Field of Classification Search
CPC ......... F05D 2260/208; F05D 2260/221; F05D 2260/2214; F05D 2260/22141; F05D 2220/3216; F05D 2220/3218; F05D 2220/3219; F01D 5/18; F01D 5/185; F01D 5/188; F01D 5/187; F01D 5/189; F01D 5/142; F01D 9/065; F04D 29/5853
See application file for complete search history.

(56) References Cited

U.S. PATENT DOCUMENTS

| | | |
|---|---|---|
| 4,229,944 A | 10/1980 | Weiler |
| 4,505,124 A | 3/1985 | Mayer |
| 4,550,573 A | 11/1985 | Rannenberg |
| 4,773,212 A | 9/1988 | Griffin et al. |
| 4,991,394 A | 2/1991 | Wright |
| 5,452,573 A | 9/1995 | Glickstein et al. |
| 5,667,168 A | 9/1997 | Fluegel |
| 5,722,241 A | 3/1998 | Huber |
| 5,724,806 A | 3/1998 | Horner |
| 6,182,435 B1 | 2/2001 | Niggemann et al. |
| 6,224,328 B1 | 5/2001 | Weigand et al. |
| 6,250,097 B1 | 6/2001 | Lui et al. |
| 6,415,595 B1 | 7/2002 | Wilmot, Jr. et al. |
| 6,430,931 B1* | 8/2002 | Horner ................... F02C 7/143 60/785 |
| 6,701,717 B2 | 3/2004 | Flatman et al. |
| 6,974,306 B2 | 12/2005 | Djeridane et al. |
| 7,260,926 B2 | 8/2007 | Sabatino et al. |
| 7,377,098 B2 | 5/2008 | Walker et al. |
| 7,398,641 B2 | 7/2008 | Stretton et al. |
| 7,882,704 B2 | 2/2011 | Chen |
| 7,966,807 B2 | 6/2011 | Norris et al. |
| 7,987,676 B2 | 8/2011 | Ast et al. |
| 8,127,547 B2 | 3/2012 | Norris et al. |
| 8,261,528 B2 | 9/2012 | Chillar et al. |
| 8,459,040 B2 | 6/2013 | Glahn et al. |
| 8,522,572 B2 | 9/2013 | Coffinbeny et al. |
| 8,858,161 B1 | 10/2014 | Ryznic et al. |
| 8,944,367 B2 | 2/2015 | Bystry, Jr. et al. |
| 8,984,884 B2 | 3/2015 | Xu et al. |
| 9,004,853 B2 | 4/2015 | Puerta et al. |
| 9,297,391 B2 | 3/2016 | Rued et al. |
| 9,580,185 B2 | 2/2017 | Rhoden et al. |
| 9,611,744 B2 | 4/2017 | Taylor |
| 10,247,098 B2 | 4/2019 | Lyons |
| 10,577,956 B2* | 3/2020 | Northall ................ F01D 5/141 |
| 2007/0017208 A1* | 1/2007 | Ralls, Jr. ................ F02C 7/08 60/39.511 |
| 2009/0133380 A1 | 5/2009 | Donnerhack |
| 2009/0188234 A1 | 7/2009 | Suciu et al. |
| 2010/0212857 A1 | 8/2010 | Bulin et al. |
| 2012/0216502 A1 | 8/2012 | Freund et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2016/0108814 A1 | 4/2016 | Schmitz |
| 2016/0131036 A1 | 5/2016 | Hintz et al. |
| 2016/0290233 A1* | 10/2016 | Ekanayake ............... F01D 5/18 |
| 2017/0030266 A1 | 2/2017 | Cerny et al. |
| 2017/0122210 A1 | 5/2017 | Schwarz et al. |
| 2017/0138372 A1 | 5/2017 | Subramanian et al. |
| 2017/0159566 A1 | 6/2017 | Sennoun et al. |
| 2017/0159675 A1 | 6/2017 | Sennoun et al. |
| 2017/0167382 A1 | 6/2017 | Miller et al. |
| 2017/0184024 A1 | 6/2017 | Sennoun |
| 2017/0254229 A1 | 9/2017 | Fletcher |

FOREIGN PATENT DOCUMENTS

| | | |
|---|---|---|
| GB | 2204361 A | 11/1988 |
| JP | S59-32893 U | 2/1984 |
| WO | WO 02/38938 A1 | 5/2002 |
| WO | WO0238938 A1 | 5/2002 |
| WO | WO2006/079438 A1 | 8/2006 |
| WO | WO2011/038188 A1 | 3/2011 |
| WO | WO2015/017000 A2 | 2/2015 |

OTHER PUBLICATIONS

European Search Report Corresponding to Application No. 182146225 dated May 17, 2019.

* cited by examiner

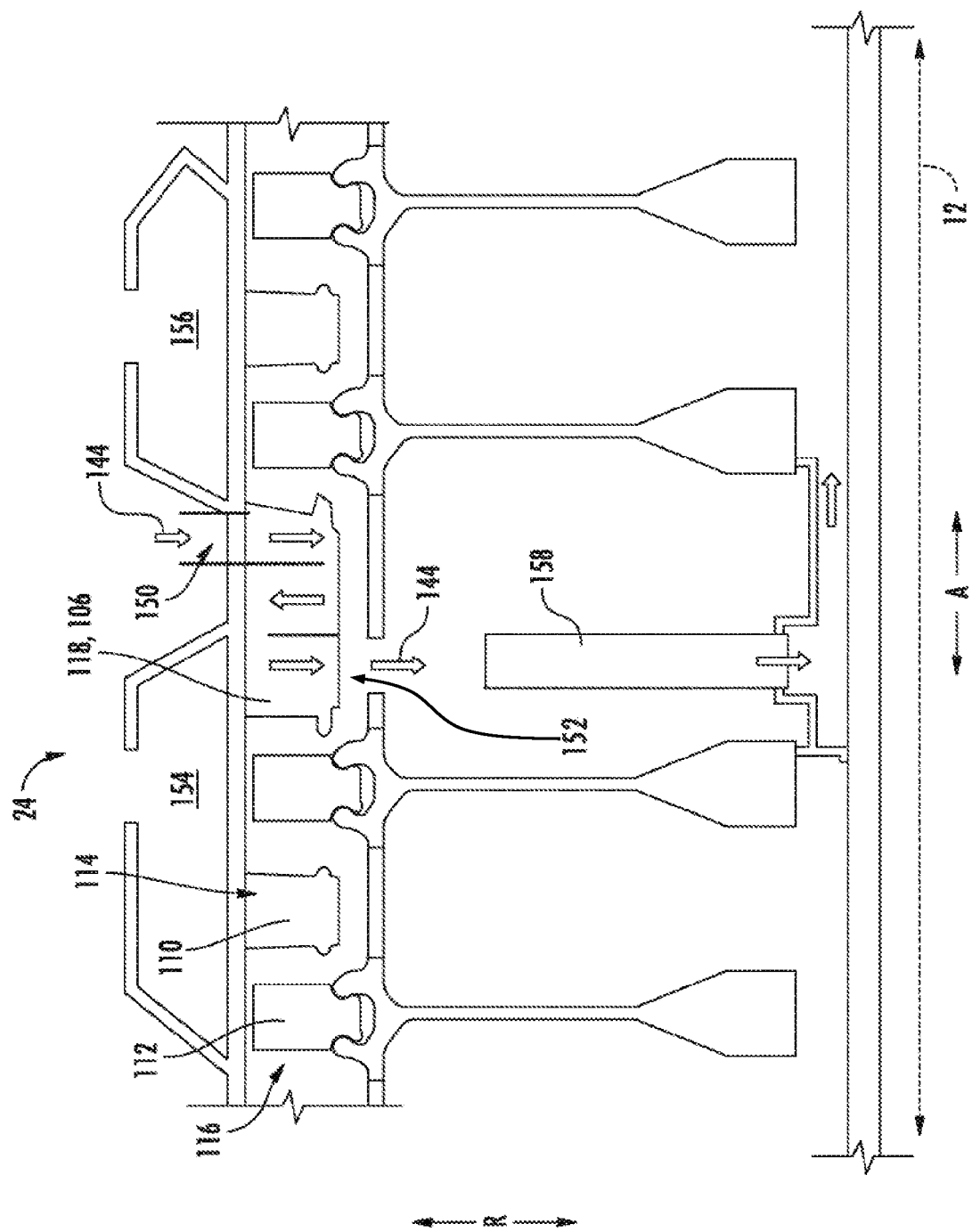

GAS TURBINE ENGINE THERMAL MANAGEMENT SYSTEM

FIELD

The present subject matter relates generally to a thermal management system, and more specifically to a thermal management system for a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator. In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts.

During operation, the gas turbine engine is operated to maintain a temperature of certain components within a desired operating temperature range in order to avoid damaging or otherwise pre-maturely wearing down such components. However, such may lead to inefficiencies within the turbomachine. Accordingly, a system capable of adjusting temperatures of certain components within the turbomachine during operation to allow the engine to operate more efficiently would be useful.

BRIEF DESCRIPTION

Aspects and advantages of the invention will be set forth in part in the following description, or may be obvious from the description, or may be learned through practice of the invention.

In one exemplary embodiment of the present disclosure a gas turbine engine is provided. The gas turbine engine includes a turbomachine including a compressor section, a combustion section, a turbine section, and an exhaust section arranged in serial flow order and together defining at least in part a core air flowpath. The gas turbine engine also includes a thermal management system including a flowpath heat exchanger coupled to, or integrated into, one or more components of the compressor section, the combustion section, the turbine section, or the exhaust section such that the flowpath heat exchanger is directly thermally coupled to an airflow through the core air flowpath.

In certain exemplary embodiments the compressor section includes a compressor with a heat transfer member and a row of compressor stator vanes one stage upstream of the heat transfer member, wherein the flowpath heat exchanger is coupled to, or integrated into, the heat transfer member, wherein the row of compressor stator vanes defines a maximum chord length, wherein the heat transfer member defines a maximum chord length, wherein the maximum chord length of the heat transfer member is greater than the maximum chord length of each of the row of compressor stator vanes.

For example, in certain exemplary embodiments the heat transfer member is a structural member.

For example, in certain exemplary embodiments the maximum chord length of the heat transfer member is at least about 10 percent greater than the maximum chord length of the row of compressor stator vanes.

For example, in certain exemplary embodiments the compressor is a high pressure compressor.

In certain exemplary embodiments the combustion section includes a plurality of fuel nozzles, and wherein the flowpath heat exchanger is coupled to, or integrated into, at least one of the plurality of fuel nozzles.

For example, in certain exemplary embodiments the flowpath heat exchanger is configured as a heat sink heat exchanger for adding heat to the airflow through the core air flowpath, wherein the thermal management system further includes a heat source heat exchanger and a thermal transport bus, wherein the heat sink heat exchanger and heat source heat exchanger are each fluidly coupled to the thermal bus such that the heat source heat exchanger is operable to transfer heat to the heat sink heat exchanger through the thermal bus.

For example, in certain exemplary embodiments the heat source heat exchanger is a waste heat recovery heat exchanger thermally coupled to the turbine section, the exhaust section, or both.

In certain exemplary embodiments the flowpath heat exchanger is positioned on a surface of the one or more components of the compressor section, the combustion section, the turbine section, or the exhaust section such that the flowpath heat exchanger is directly exposed to the airflow through the core air flowpath.

In certain exemplary embodiments the flowpath heat exchanger is configured as a heat source heat exchanger for removing heat from the airflow through the core air flowpath, wherein the thermal management system further includes a heat sink heat exchanger and a thermal transport bus, wherein the heat source heat exchanger and heat sink heat exchanger are each fluidly coupled to the thermal bus such that the heat source heat exchanger is operable to transfer heat to the heat sink heat exchanger through the thermal bus.

In certain exemplary embodiments the flowpath heat exchanger is a heat source heat exchanger for removing heat from the airflow through the core air flowpath, and wherein the flowpath heat exchanger is further configured as an air-to-air heat exchanger.

For example, in certain exemplary embodiments the thermal management system further includes a heat sink heat exchanger in airflow communication with the flowpath heat exchanger at a location upstream of the flowpath heat exchanger.

For example, in certain exemplary embodiments the compressor section includes a high pressure compressor, and wherein the flowpath heat exchanger is positioned within the high pressure compressor.

For example, in certain exemplary embodiments the flowpath heat exchanger defines an inlet and an outlet, wherein the inlet is positioned to receive a cooled cooling air airflow from the heat sink heat exchanger at a location outward of the core air flowpath along a radial direction, and wherein the outlet is positioned to provide the cooled cooling air airflow to a flowpath located inward of the core air flowpath along the radial direction.

For example, in certain exemplary embodiments the inlet is spaced from the outlet along an axial direction of the gas turbine engine.

For example, in certain exemplary embodiments the gas turbine engine further includes ses a vortex tube positioned inward of the outlet of the flowpath heat exchanger for receiving the cooled cooling air airflow from the flowpath heat exchanger.

For example, in certain exemplary embodiments the compressor defines a low stage bleed port and a high stage bleed port, and wherein the inlet of the flowpath heat exchanger is positioned forward of the high stage bleed port and aft of the low stage bleed port.

For example, in certain exemplary embodiments the turbine section includes a turbine having a plurality of turbine rotor blades and defines a cooling air flowpath for providing a cooling airflow to at least one of the plurality of turbine rotor blades, and wherein the cooling air flowpath is in airflow communication with the outlet of the flowpath heat exchanger.

For example, in certain exemplary embodiments the heat sink heat exchanger is a bypass airflow heat exchanger.

In another exemplary embodiment of the present disclosure, a gas turbine engine is provided. The gas turbine engine includes a turbomachine including a compressor section defining at least in part a core air flowpath, the compressor section including a heat transfer member and a compressor having a row of compressor stator vanes one stage upstream of the heat transfer member. The gas turbine engine also includes a thermal management system including a flowpath heat exchanger coupled to, or integrated into, the heat transfer member of the compressor section such that the flowpath heat exchanger is thermally coupled to an airflow through the core air flowpath. Additionally, the row of compressor stator vanes defines a maximum chord length, wherein the heat transfer member defines a maximum chord length, wherein the maximum chord length of the heat transfer member is greater than the maximum chord length of each of the row of compressor stator vanes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 10 as a close-up, simplified, schematic view of the exemplary thermal management system of FIG. 9.

DETAILED DESCRIPTION

Figure 1:
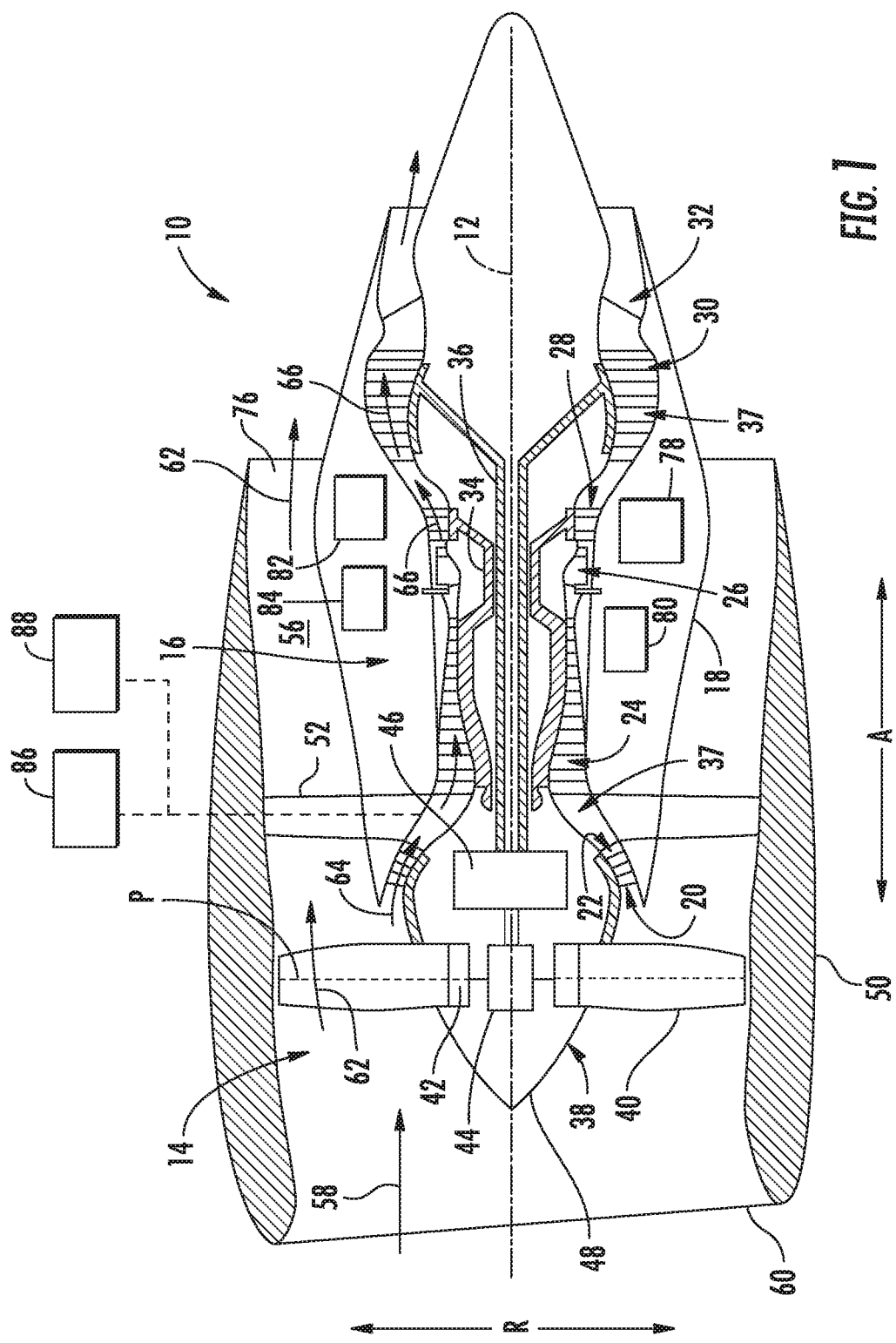
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the Figs., FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. As stated, for the embodiment shown, the turbofan engine 10 is a high bypass turbofan engine 10. Accordingly, for the embodiment depicted, the bypass ratio defined by the turbofan engine 10 is greater than about 6:1 and up to about 30:1.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Figure 3:
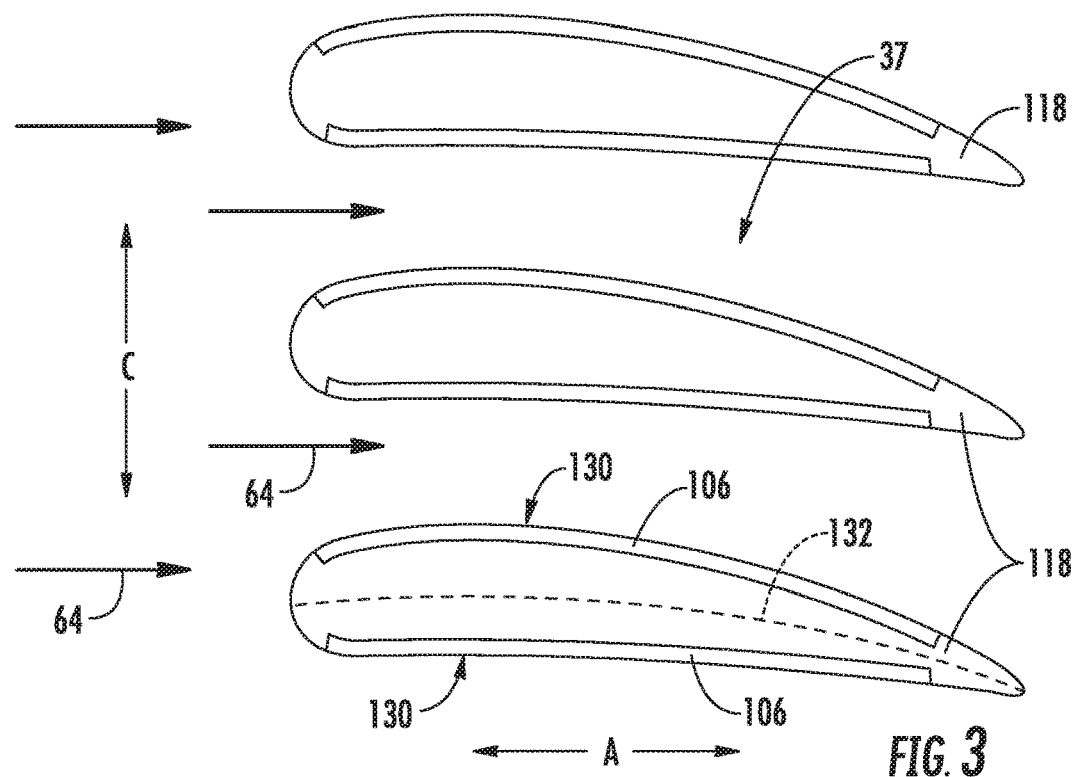
FIG. 3 is a schematic, cross-sectional view of a stage of heat transfer members in accordance with an exemplary embodiment of the present disclosure.

Moreover, as is depicted schematically, the exemplary turbofan engine 10 further includes various accessory systems to aid in the operation of the turbofan engine 10 and/or an aircraft including the turbofan engine 10 (see, e.g., FIG. 3). For example, the exemplary turbofan engine 10 further includes a main lubrication system 78 configured to provide a lubricant to, e.g., various bearings and gear meshes in the compressor section (including the LP compressor 22 and HP compressor 24), the turbine section (including the HP turbine 28 and the LP turbine 30), the HP spool 34, the LP spool 36, and the power gear box 46. The lubricant provided by the main lubrication system 78 may increase the useful life of such components and may remove a certain amount of heat from such components. Additionally, the turbofan engine 10 includes a cooled cooling air (CCA) system 80 for providing air from one or both of the HP compressor 24 or LP compressor 22 to one or both of the HP turbine 28 or LP turbine 30. Moreover, the exemplary turbofan engine 10 includes an active thermal clearance control (ACC) system 82 for cooling a casing of the turbine section to maintain a clearance between the various turbine rotor blades and the turbine casing within a desired range throughout various engine operating conditions. Furthermore, the exemplary turbofan engine 10 includes a generator lubrication system 84 for providing lubrication to an electronic generator, as well as cooling/heat removal for the electronic generator. The electronic generator may provide electrical power to, e.g., a startup electric motor for the turbofan engine 10 and/or various other electronic components of the turbofan engine 10 and/or an aircraft including the turbofan engine 10.

As is also depicted schematically, the exemplary turbofan engine 10 depicted drives or enables various other accessory systems, e.g., for an aircraft (not shown) including the exemplary turbofan engine 10. For example, the exemplary turbofan engine 10 provides compressed air from the compressor section to an environmental control system (ECS) 86. The ECS 86 may provide an air supply to a cabin of the aircraft for pressurization and thermal control. Additionally, air may be provided from the exemplary turbofan engine 10 to an electronics cooling system 88 for maintaining a temperature of certain electronic components of the turbofan engine 10 and/or aircraft within a desired range.

Prior turbofan engines 10 and/or aircrafts included individual heat exchangers for each of these accessory systems to remove heat from air and/or lubrication in such systems. However, aspects of the present disclosure may include a thermal management system 100 (see FIGS. 2 and 3) for transferring heat from some or all of such accessory systems to more efficiently remove such heat and/or utilize such heat.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc., or alternatively may be any gas turbine engine for use in aeroderivative industries, power generation industries, etc. Additionally, in still other exemplary embodiments, the exemplary turbofan engine 10 may include or be operably connected to any other suitable accessory systems and may be configured in any other suitable manner. Additionally, or alternatively, the exemplary turbofan engine 10 may not include or be operably connected to one or more of the accessory systems discussed above.

Figure 2:
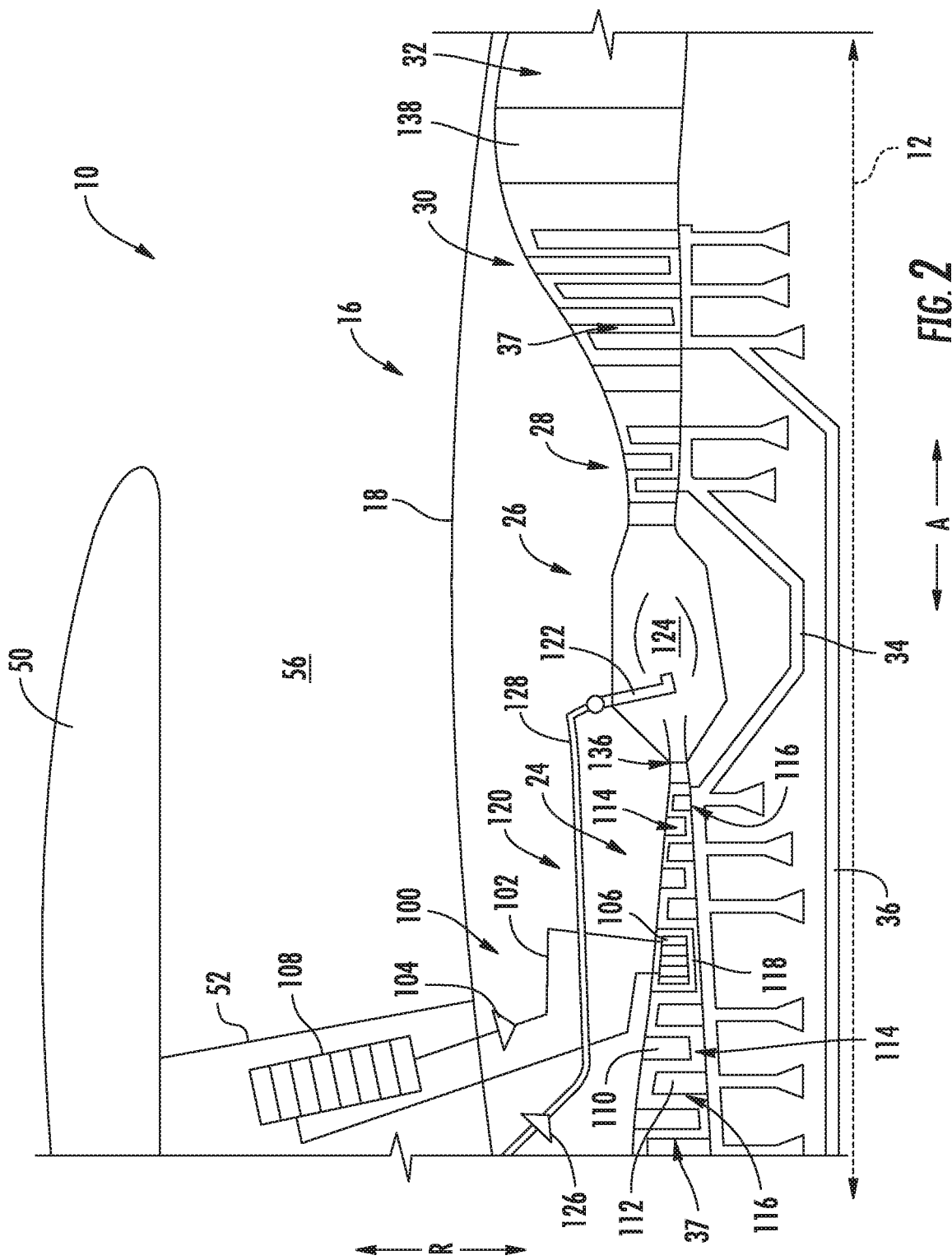
FIG. 2 is a simplified, schematic view of a thermal management system in accordance with an exemplary embodiment of the present disclosure.

Referring now to FIG. 2, a schematic, cross-sectional view of a section of a gas turbine engine 10 including a thermal management system 100 in accordance with an exemplary embodiment of the present disclosure is provided. Referring first to the gas turbine engine 10, in general, the exemplary gas turbine engine 10 may be configured in a similar manner to the exemplary turbofan engine 10 described above with reference to FIG. 1. Accordingly, the same or similar numbers may refer to same or similar parts.

For example, as is depicted the exemplary gas turbine engine 10 of FIG. 2 generally includes a turbomachine 16 and an outer nacelle 50, with the turbomachine 16 at least partially surrounded by the outer nacelle 50. Moreover, the outer nacelle 50 defines a bypass airflow passage 56 with the turbomachine 16 (i.e., between the outer nacelle 50 and the turbomachine 16), and more specifically, defines the bypass airflow passage 56 between the outer nacelle 50 and an outer casing 18 of the turbomachine 16. Furthermore, the gas turbine engine 10 includes an outlet guide vane 52 extending between the outer nacelle 50 and the turbomachine 16, the outlet guide vane 52 supporting the turbomachine 16 relative to the outer nacelle 50.

In such a manner, the gas turbine engine 10 may be referred to as a turbofan engine (similar to the exemplary turbofan engine 10 of FIG. 1). Further, it will be appreciated from FIG. 3, and the discussion above with reference to FIG. 1, that the gas turbine engine 10 may further define a relatively high bypass ratio, and therefore may be referred to as a "high-bypass" turbofan engine.

Referring still to FIG. 2, the exemplary turbomachine 16 depicted generally includes a compressor section, a combustion section 26, a turbine section, and an exhaust section 32. The compressor section, combustion section 26, turbine section, and exhaust section 32 together define at least in part a core air flowpath he 37. Additionally, the compressor section generally includes a high pressure ("HP") compressor 24, and the turbine section generally includes a low pressure ("LP") turbine 30 and an HP turbine 28. The LP turbine 30 is coupled to, and configured to drive, an LP spool 36, and the HP turbine 28 is coupled to and configured to drive, an HP spool 34. Notably, the HP spool 34 is further coupled to the HP compressor 24, such that the HP turbine 28 may drive the HP compressor 24 through the HP spool 34, and the LP spool 36 may be further coupled to, e.g., an LP compressor, a fan, etc. for driving such component (see, e.g., FIG. 1).

The turbomachine 16 further includes a fuel delivery system 120 for providing a fuel flow to the combustion section 26 of the turbomachine 16. For example, the exemplary fuel delivery system 120 generally includes one or more fuel nozzles 122 configured to provide a mixture of fuel and air to a combustion chamber 124 of the combustion section 26, as well as a fuel pump 126 and a plurality of fuel lines 128. The fuel pump 126 may provide for the fuel flow through the plurality of fuel lines 128 from a fuel source (not shown) to the plurality of fuel nozzles 122.

Moreover, as stated, the exemplary gas turbine engine 10 of FIG. 2 includes the thermal management system 100. For the embodiment depicted, the thermal management system 100 generally includes a flowpath heat exchanger (described in detail below) and a thermal transport bus 102. For the embodiment of FIG. 2, the thermal management system 100 is a closed loop system, with the exemplary thermal transport bus 102 including an intermediary heat exchange fluid flowing therethrough (however, alternative embodiments are described below). The thermal transport bus 102 may be formed of one or more suitable fluid conduits. The heat exchange fluid may have a high temperature operating range. A pump 104 is provided in fluid communication with the heat exchange fluid in the thermal transport bus 102 for generating a flow of the heat exchange fluid in/through the thermal transport bus 102. As viewed in FIG. 2, the pump 104 may generate a flow of the heat exchange fluid generally in a clockwise direction through the thermal transport bus 102. The pump 104 may be a rotary pump including an impeller, or alternatively may be any other suitable fluid pump. Additionally, the pump 104 may be powered by an electric motor, or alternatively may be in mechanical communication with and powered by, e.g., the HP shaft 34 or the LP shaft 36 of the turbofan engine 10. In still other embodiments, the pump 104 may be powered by an auxiliary turbine, which in turn may be powered by bleed air from a compressor section of a gas turbine engine 10 within which the system 100 is incorporated.

Additionally, as stated, the thermal management system 100 includes a flowpath heat exchanger. The flowpath heat exchanger is coupled to, or integrated into, one or more components of the compressor section, the combustion section 26, the turbine section, or the exhaust section 32 such that the flowpath heat exchanger is directly thermally coupled to an airflow 64 through the core air flowpath 37 of the turbomachine 16 of the gas turbine engine 10. Notably, as used herein, the term "directly thermally coupled," with reference to two components or mediums, refers to the two components or mediums being capable of transferring heat directly and not through intermediate components or mediums.

More specifically, for the embodiment depicted, the flowpath heat exchanger is configured as a heat source heat exchanger 106. The heat source heat exchanger 106 is in thermal communication with the thermal transport bus 102, or rather for the embodiment depicted, in fluid communication with the thermal transport bus 102. For the embodiment depicted, the heat source heat exchanger 106 is configured to transfer heat from an airflow 64 through the core air flowpath 37 of the turbomachine 16 of the gas turbine engine 10 to the heat exchange fluid in the thermal transport bus 102. Notably, although for the embodiment depicted the thermal management system 100 is depicted including a single heat source heat exchanger 106, in other exemplary embodiments, any other suitable number of heat source heat exchangers 106 may be included. For example, in other embodiments, there may be at least two heat source heat exchangers 106 in thermal communication with the heat exchange fluid in the thermal transport bus, or alternatively, there may be at least three heat source heat exchangers 106, at least four heat source heat exchangers 106, etc. Notably, when a plurality of heat source heat exchangers 106 are provided, the heat source heat exchangers 106 may be arranged in series flow along the thermal transport bus 102, in parallel flow along the thermal transport bus 102, or a combination thereof.

Moreover, the exemplary thermal management system 100 of FIG. 2 further includes one or more heat sink heat exchangers 108 in thermal communication with the thermal transport bus 102, or rather in fluid communication with the thermal transport bus 102. The one or more heat sink heat exchangers 108 are, for the embodiment depicted, configured for transferring heat from the heat exchange fluid in the thermal transport bus 102, e.g., to atmosphere, to fuel, to a fan stream, etc. For example, in certain embodiments the one or more heat sink heat exchangers 108 may include at least one of a fuel heat exchanger, a bypass airflow (or fan stream) heat exchanger, a RAM heat exchanger, a bleed air heat exchanger, an engine intercooler, or a cold air output of an air cycle system. For example, when the one or more heat sink heat exchangers 108 includes a fuel heat exchanger, the heat sink heat exchanger 108 may be a "fluid to heat exchange fluid" heat exchanger wherein heat from the heat exchange fluid is transferred to a stream of liquid fuel for the gas turbine engine 10. Moreover, when the one or more heat sink heat exchangers 108 includes a bypass airflow heat exchanger, the heat sink heat exchanger 108 may generally be an "air to heat exchange fluid" heat exchanger which flows, e.g., bypass air from a bypass airflow passage over heat exchange fluid to remove heat from the heat exchange fluid. Additionally, when the one or more heat sink heat exchangers 108 includes a RAM heat exchanger, the heat sink heat exchanger 108 may be configured as an "air to heat exchange fluid" heat exchanger integrated into one or both of the turbofan engine 10 or an aircraft including the turbofan engine 10. During operation, the RAM heat exchanger may remove heat from any heat exchange fluid therein by flowing a certain amount of RAM air over the RAM heat exchanger. Further, when the one or more heat sink heat exchangers 108 includes a bleed air heat exchanger, the heat sink heat exchanger 108 may generally be an "air to heat exchange fluid" heat exchanger which flows, e.g., bleed air from an LP compressor 22 over heat exchange fluid to remove heat from the heat exchange fluid.

Notably, it will be appreciated that as used herein, the term "heat source" and "heat sink" as used to describe a heat exchanger refer to typical operation of the heat exchanger with respect to the thermal management system 100 and thermal bus 102. For example, a heat source heat exchanger 106 refers to a heat exchanger that is generally operable to provide heat to the thermal management system 100 and thermal bus 102. However, relative to other systems to which it is thermally connected, the heat source heat exchanger 106 may act as a heat sink. Similarly, for example, a heat sink heat exchanger 108 refers to a heat exchanger that is generally operable to remove heat from the thermal management system 100 and thermal bus 102. However, relative to other systems to which it is thermally connected, the heat sink heat exchanger 108 may act as a heat source. Further, during certain operations of the engine and thermal management system 100, the heat source heat exchanger 106 may further be configured to act as a heat sink for the thermal management system 100 and the heat sink heat exchanger 108 may further be configured to act as a heat source for the thermal management system 100.

Referring still to the embodiment of FIG. 2, the one or more heat sink heat exchangers 108 of the thermal management system 100 depicted includes a single heat sink heat exchangers 108 configured as a bypass airflow heat exchanger. More particularly, for the embodiment of FIG. 2, the heat sink heat exchanger 108 is integrated into, or couple to, one or more components exposed to the bypass airflow passage, and more specifically, is integrated into, or couple to, an outlet guide vane 52.

However, in other exemplary embodiments, the one or more heat sink heat exchangers 108 may include any other suitable number of heat sink heat exchangers 108. For example, in other exemplary embodiments, at least two heat sink heat exchangers 108 may be provided, at least three heat sink heat exchangers 108 may be provided, at least four heat sink heat exchangers 108 may be provided, etc. Notably, when a plurality of heat sink heat exchangers 108 are provided, the heat sink heat exchangers 108 may be arranged in series flow along the thermal transport bus 102, in parallel flow along the thermal transport bus 102, or a combination thereof.

It will be appreciated, however, that the exemplary thermal management system 100 described with reference to FIG. 2 is provided by way of example only. In other exemplary embodiments, one or more of which will be discussed in greater detail below, the thermal management system 100 may have any other suitable configuration.

Referring particularly to the flowpath heat exchanger of the exemplary thermal management system 100 of FIG. 2, or more specifically, to the heat source heat exchanger 106, as stated, the heat source heat exchanger 106 is configured for removing heat from the airflow 64 through the core air flowpath 37 of the turbomachine 16 and is further operable to transfer such heat to the heat sink heat exchanger 108 through the thermal transport bus 102. More specifically, for the embodiment depicted, the flowpath heat exchanger/heat source heat exchanger 106 is coupled to, or integrated into, one or more components of the compressor section, and more specifically, of the HP compressor 24 of the compressor section.

More specifically, still, for the embodiment depicted, it will be appreciated that the HP compressor 24 of the compressor section includes a plurality of compressor stator vanes 110 and a plurality of compressor rotor blades 112, or rather, a plurality of stages 114 of compressor stator vanes 110 and a plurality of stages 116 of compressor rotor blades 112. Notably, the term "compressor stator vanes," as used herein, refers to non-structural vanes within the compressor section extending at least partially through the core air flowpath 37. In addition, the HP compressor 24 of the compressor section includes a heat transfer member 118. For the embodiment depicted, the heat transfer member 118 is positioned between two stages 116 of compressor rotor blades 112, and upstream of a stage 114 of compressor stator vanes 110 and downstream of a stage of compressor stator vanes 110 (e.g., immediately upstream of stage N-1 and immediately downstream of stage N-3, with "N" being the total number of stages of the HP compressor 24). More particularly, the heat transfer member 118 may be a plurality of heat transfer members 118 spaced along a circumferential direction C of the gas turbine engine 10. In such a manner, the heat transfer member 118 (or rather, the plurality of heat transfer members 118) may effectively take the place of a stage 114 of compressor stator vanes 110 (e.g., stage N-2). Notably, however, in other embodiments, the heat transfer member(s) 118 may effectively take the place of two or more stages 114 of compressor stator vanes 110, and further may be positioned at a forward or aft end of the HP compressor 24, such that the heat transfer members 118 may simply be positioned adjacent to (e.g., one stage away from) a single stage 114 of compressor stator vanes 110.

For example, referring now to FIG. 3, a cross-sectional, plan view of a plurality of the heat transfer members 118 described above with reference to FIG. 2 are provided. As shown, the plurality of heat transfer members 118 are spaced along the circumferential direction C in a manner similar to the spacing along the circumferential direction C of compressor stator vanes 110 of a stage 114 of compressor stator vanes 110 within a compressor, such as the HP compressor 24, of the compressor section.

As will further be appreciated, for the embodiment depicted, the flowpath heat exchanger, or rather, the heat source heat exchanger 106, is coupled to, or integrated into, the heat transfer member 118, or rather the plurality of heat transfer members 118. Specifically, for the embodiment shown, the flowpath heat exchanger/heat source heat exchanger 106 is positioned on a surface 130 of the heat transfer member 118, or rather, the plurality of heat transfer members 118, of the compressor section such that the flowpath heat exchanger/heat source heat exchanger 106 is directly exposed to the airflow 64 through the core air flowpath 37 of the turbomachine 16. For example, the flowpath heat exchanger/heat source heat exchanger 106 may be a separate component coupled to the heat transfer member 118, or alternatively, may be a portion of the heat transfer member having passages for heat exchange fluid to flow therethrough adjacent to the surface 130 of the heat transfer member 118 that is exposed core air flowpath 37. In such a manner, the flowpath heat exchanger/heat source heat exchanger 106 may allow the heat exchange fluid flowing therethrough to directly contact the wall (and surface 130) exposed to the core air flowpath 37 to more efficiently/directly exchange heat with the airflow 64 through the core air flowpath 37 In such a manner, the heat source heat exchanger 106 may more effectively transfer heat with the airflow 64 through the core air flowpath 37, and more specifically, for the embodiment depicted the more effectively remove an amount of heat from the airflow 64 through the core air flowpath 37.

Figure 4:
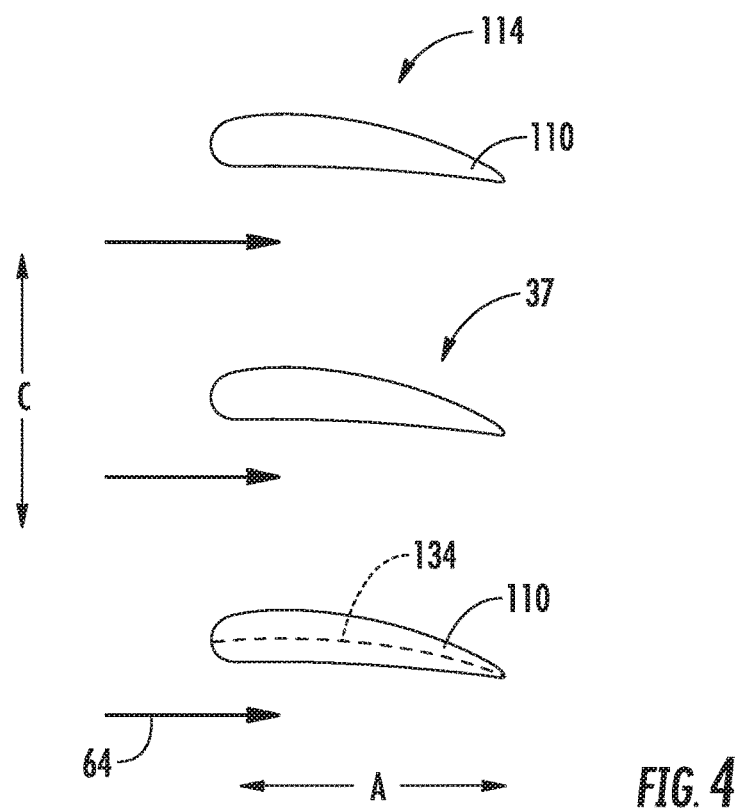
FIG. 4 is a schematic, cross-sectional view of the stage of stator vanes in accordance with an exemplary embodiment of the present disclosure.

Referring now also to FIG. 4, a cross-sectional, plan view of a row of compressor stator vanes 110, which may be one or more of the stages 114 of compressor stator vanes 110, is provided. For example, the row of compressor stator vanes 110 depicted in FIG. 4 may be the row of compressor stator vanes one stage upstream of the heat transfer member 118 (e.g., the row of compressor stator vanes 110 in FIG. 4 may be in the stage N–3 of compressor stator vanes 110 in FIG. 2). In order to increase an effectiveness or operability of the flowpath heat exchanger/heat source heat exchanger 106 within the heat transfer member(s) 118, each of the plurality of heat transfer members 118 define a relatively long chord length as compared to the compressor stator vanes 110 of the various stages 114 of compressor stator vanes 110. For example, as is depicted, each of the plurality of heat transfer members 118 defines a maximum chord length 132. Additionally, the row of compressor stator vanes 110 also defines a maximum chord length 134. It will be appreciated that the maximum chord length 132 of the plurality of heat transfer members 118 refers to the longest chord length of the heat transfer members 118 at a location halfway along a span of the plurality of heat transfer members 118, and similarly, the maximum chord length 134 of the row of compressor stator vanes 110 refers to the longest chord length of the compressor stator vanes (within the same stage, or row, of compressor stator vanes), also at a location halfway along a span of the compressor stator vanes. For example, for the embodiment of FIGS. 2 through 4, the maximum chord length 134 may refer to a cord length of the compressor stator vanes 110 in the forward-most stage 114 of compressor stator vanes 110.

As is shown, the chord length 132 of the heat transfer member(s) 118 is greater than the maximum chord length 134 of the row of compressor stator vanes 110. Specifically, for the embodiment depicted, the chord length 132 of the heat transfer member(s) 118 is at least about ten percent greater than the maximum chord length 134 of the row of compressor stator vanes 110, such as at least about fifteen percent greater, such as at least about twenty percent greater, such as at least about twenty-five percent greater, such as at least about forty percent greater, such as at least about fifty percent greater, such as at least about seventy-five percent greater, such as up to about five hundred percent greater.

In such a manner, the thermal management system 100 may effectively reduce a temperature of the airflow 64 through the core air flowpath 37 within the HP compressor 24 of the turbomachine 16. Such may allow for the HP compressor 24 to compress such airflow 64 to a higher pressure, increasing an overall pressure ratio of the compressor section, and therefore increasing an effectiveness of the turbomachine 16 and gas turbine engine 10.

Figure 5:
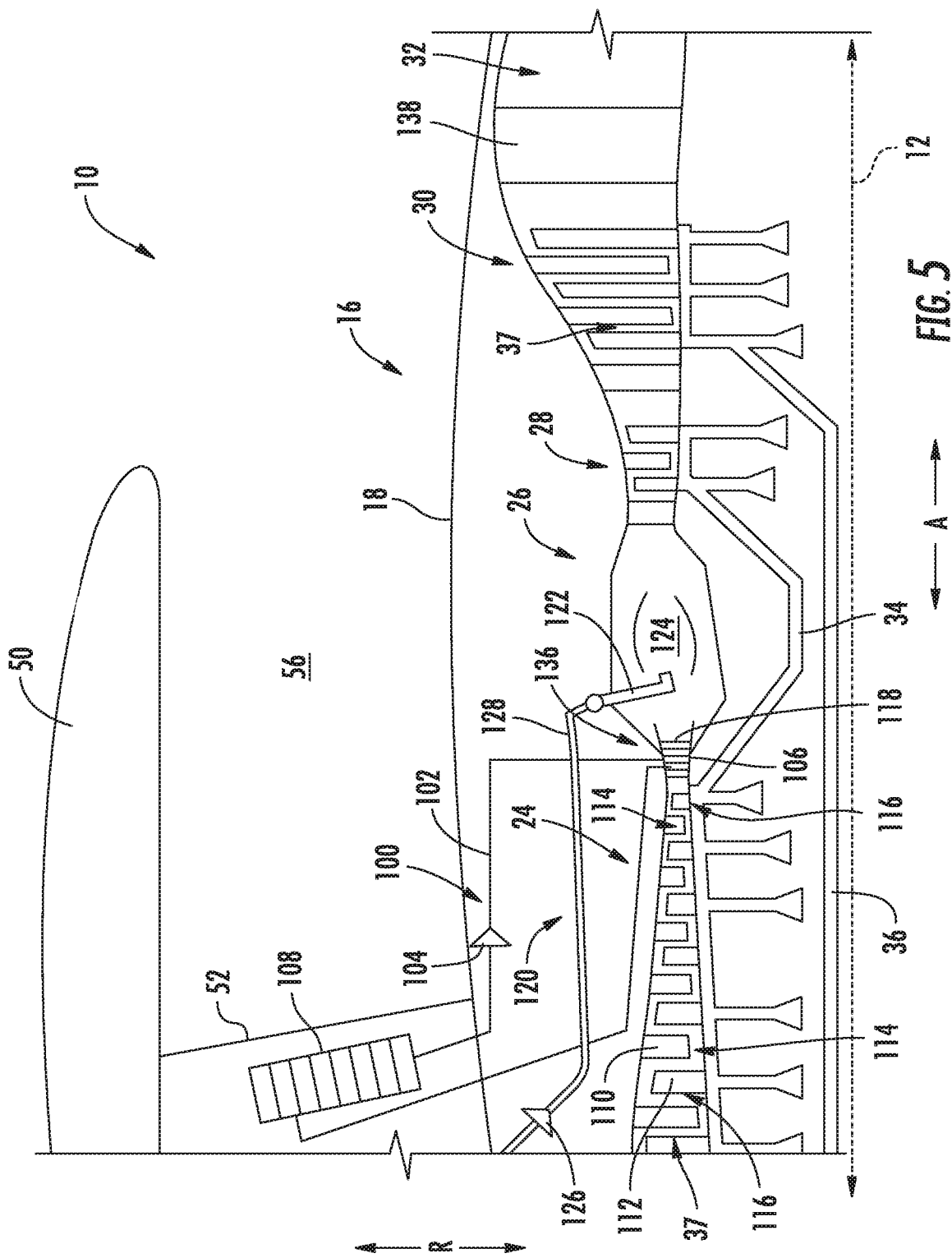
FIG. 5 is a simplified, schematic view of a thermal management system in accordance with another exemplary embodiment of the present disclosure.
Figure 6:
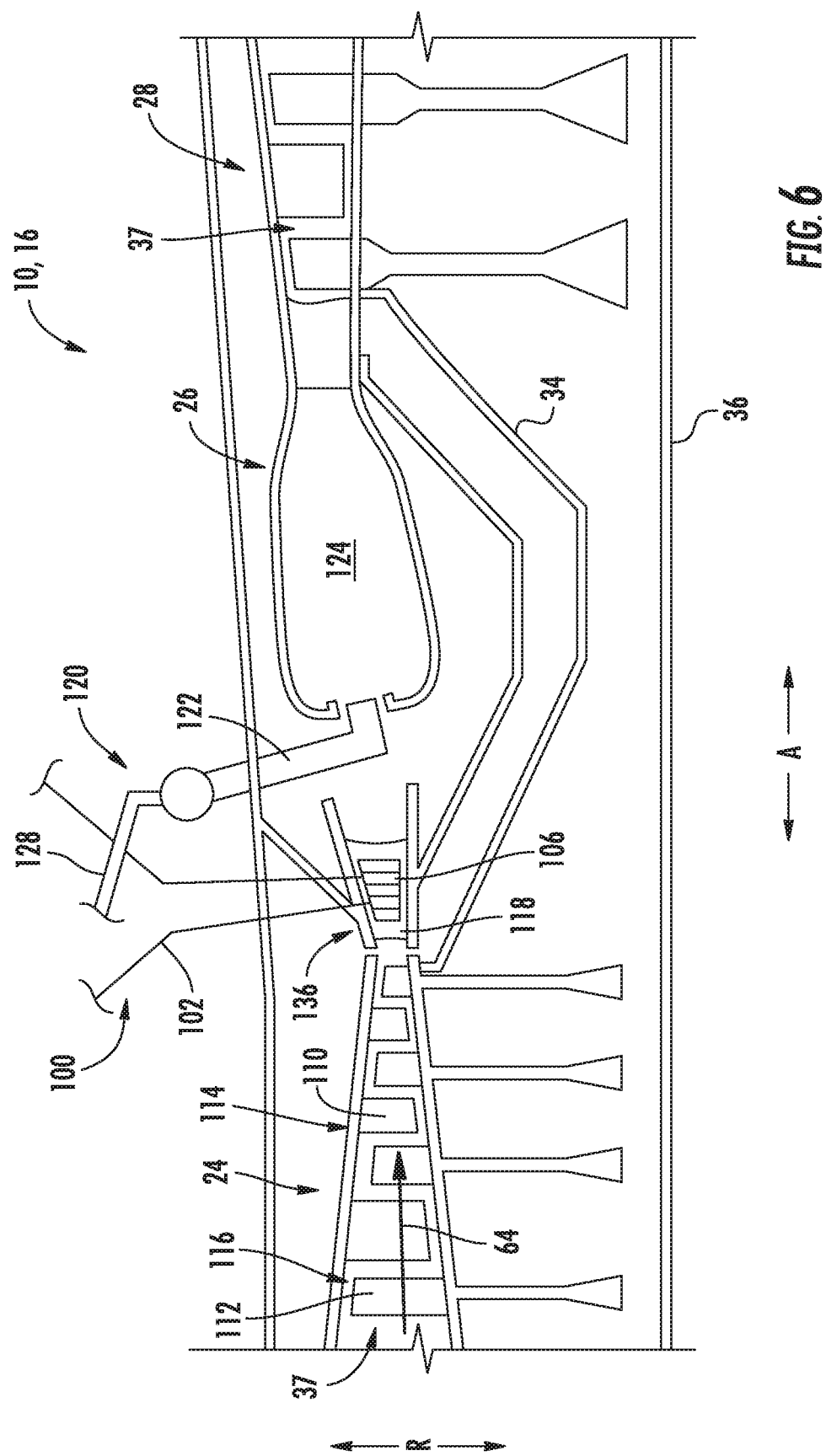
FIG. 6 is close-up, simplified, schematic view of the exemplary thermal management system of FIG. 5.

It will be appreciated, however, that in other exemplary embodiments, the heat transfer member 118 may be positioned at any other suitable location within the compressor. For example, referring now to FIGS. 5 and 6, schematic views of a gas turbine engine 10 having a thermal management system 100 incorporated therein, each configured in accordance with another exemplary embodiment of the present disclosure, are provided. More specifically, FIG. 5 is a schematic, cross-sectional view of a section of a gas turbine engine 10 including a thermal management system 100 in accordance with another exemplary embodiment of the present disclosure; and FIG. 6 provides a close-up cross-sectional view of a portion of the exemplary gas turbine engine 10 and thermal management system 100 of FIG. 5. It will be appreciated that the exemplary gas turbine engine 10 and thermal management system 100 of FIGS. 5 and 6 are configured in substantially the same manner as the exemplary gas turbine engine 10 and thermal management system 100 described above with reference to FIG. 2. Accordingly, the same or similar numbers may refer to same or similar parts.

For example, as will be appreciated, the thermal management system 100 of FIGS. 5 and 6 generally includes a flowpath heat exchanger coupled to, or integrated into, one or more components of the compressor section, the combustion section 26, the turbine section, or the exhaust section 32 such that the flowpath heat exchanger is directly thermally coupled to an airflow 64 through the core air flowpath 37. More specifically, the exemplary thermal management system 100 generally includes a heat sink heat exchanger 108, a thermal transport bus 102, and a heat source heat exchanger 106. For the embodiment depicted, the flowpath heat exchanger is configured as the heat source heat exchanger 106 of the thermal management system 100, such that the flowpath heat exchanger/heat source heat exchanger 106 is operable to remove heat from the airflow 64 through the core air flowpath 37, and transfer such heat to the heat sink heat exchanger 108 through the thermal transport bus 102.

Further, as with the embodiment of FIG. 2, the compressor section includes a compressor, or rather, an HP compressor 24, with the HP compressor 24 including a heat transfer member 118. The flowpath heat exchanger/heat source heat exchanger 106 is coupled to, or integrated into, the heat transfer member 118. As with the embodiment above, the heat transfer member 118 may actually be a plurality of heat transfer members 118 spaced along the circumferential direction C of the gas turbine engine 10 (e.g., in the same manner depicted in FIG. 3). However, for the embodiment depicted, the heat transfer member 118 is a structural member of the compressor section. More specifically, for the embodiment depicted, the heat transfer member 118 is a structural member located downstream of the various stages 116 of compressor rotor blades 112 of the HP compressor 24. The heat transfer member 118 may also function as a vane within a diffuser portion 136 of the compressor section, upstream of the combustion section 26.

It will be appreciated, as used herein, the term "structural member," with reference to the heat transfer member 118, refers to the heat transfer member 118 functioning to transfer a load from a component attached to a radially outer end of the heat transfer member 118 to a component attached to a radially inner end of the heat transfer member 118 (or vice versa). Notably, although for the embodiment depicted the heat transfer member 118 is positioned downstream of the plurality of compressor rotor blades 112 of the HP compressor 24, in other embodiments, the heat transfer member 118, configured as a structural member, may instead be positioned at any other suitable location within the compressor section, such as upstream of the HP compressor 24 and downstream of an LP compressor 22, upstream of the LP compressor 22, etc. Additionally, in other embodiments, the heat transfer member 118, configured as a structural member, may instead be positioned at any other suitable location within the core air flowpath 37 of the turbomachine 16.

Moreover, although for the embodiment depicted, the flowpath heat exchanger is depicted being configured as a heat source heat exchanger 106 configured to remove heat from the airflow 64 through the core air flowpath 37, in other exemplary embodiments, the flowpath heat exchanger may instead be configured as a heat sink heat exchanger 108 configured to add heat to the airflow 64 through the core air flowpath 37. For example, in other embodiments, the flowpath heat exchanger may be integrated into a heat transfer member 118 configured as a structural member within the diffuser portion 136 of the turbomachine 16 and configured as a heat sink heat exchanger 108 for adding heat to the airflow 64 to the core air flowpath 37 upstream of the compressor section 26. (Notably, with such a configuration, the flowpath heat exchanger may function similarly to the exemplary flowpath heat exchanger discussed below with reference to FIGS. 7 and 8, and the thermal management system 100 may have one or more heat source heat exchangers 106 configured in any other suitable manner.)

Figure 7:
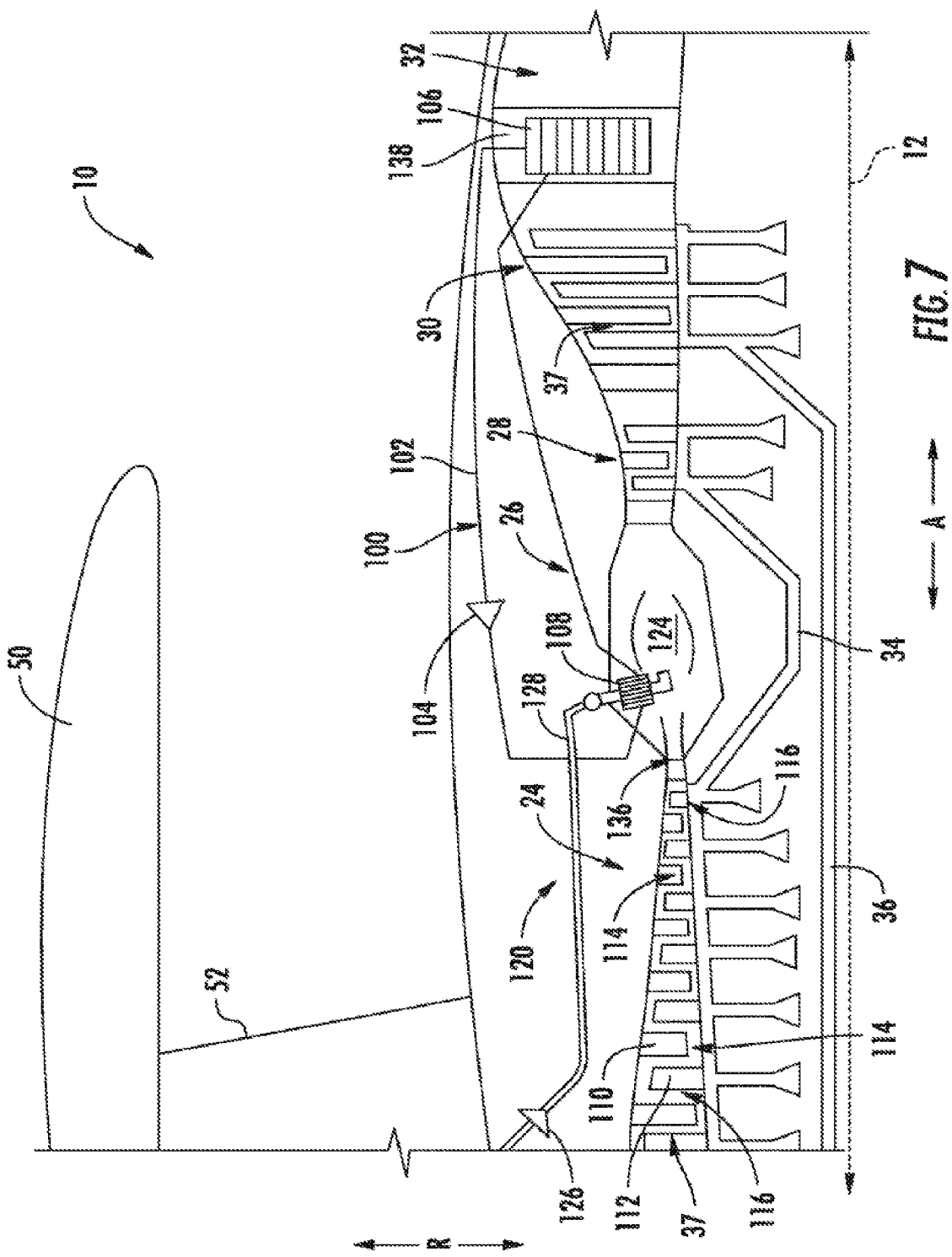
FIG. 7 is a simplified, schematic view of a thermal management system in accordance with yet another exemplary embodiment of the present disclosure.
Figure 8:
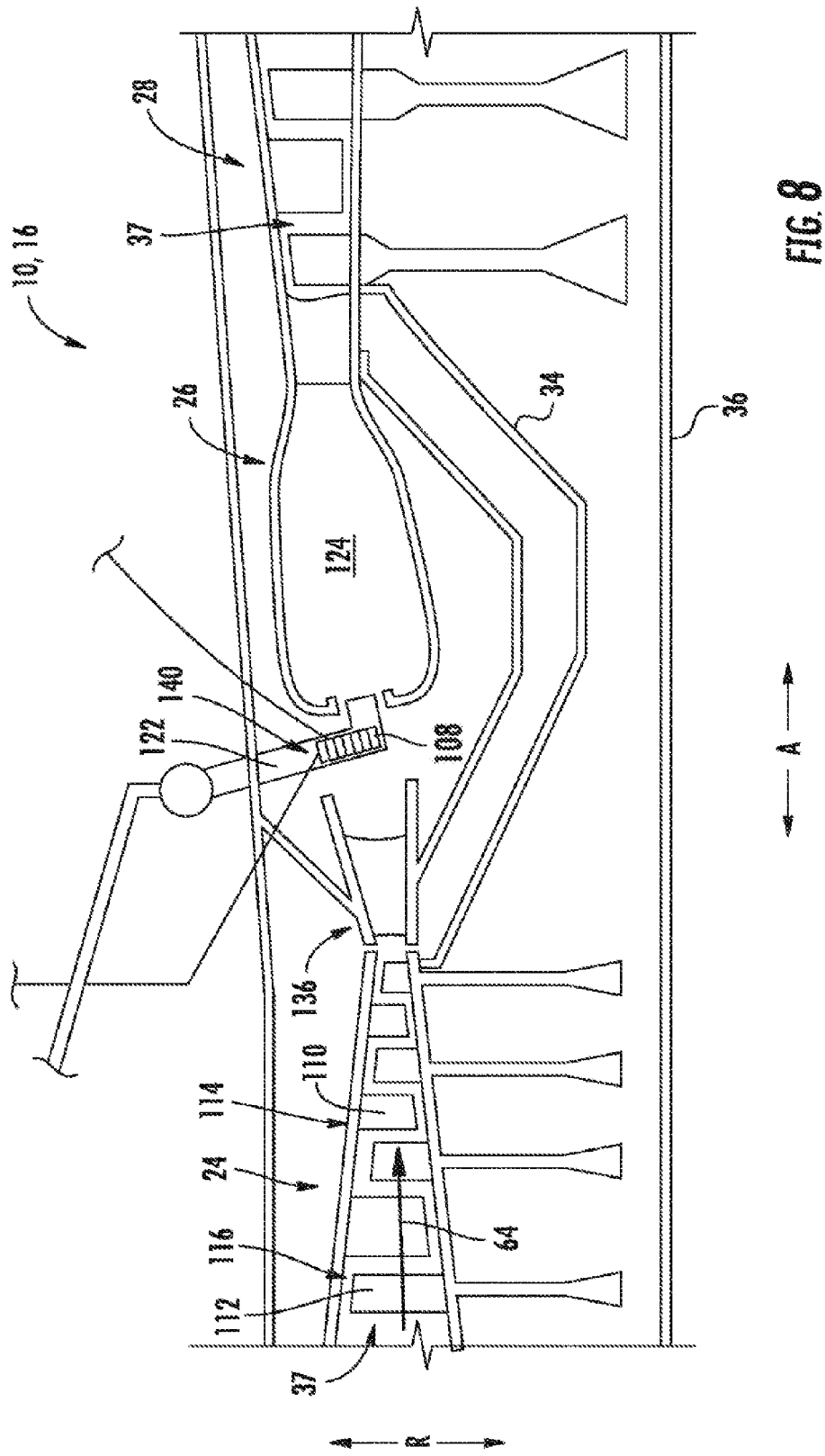
FIG. 8 is close-up, simplified, schematic view of the exemplary thermal management system of FIG. 7.

It will be appreciated, however, that in still other exemplary embodiments, the gas turbine engine 10 including the thermal management system 100 may be configured in accordance with still other exemplary embodiments. For example, referring now to FIGS. 7 and 8, schematic views of a gas turbine engine 10 having a thermal management system 100 incorporated therein, each configured in accordance with another exemplary embodiment of the present disclosure, are provided. More specifically, FIG. 7 it is a schematic, cross-sectional view of a section of a gas turbine engine 10 including a thermal management system 100 in accordance with another exemplary embodiment of the present disclosure; and FIG. 8 is a close-up cross-sectional view of a portion of the exemplary gas turbine engine 10 and thermal management system 100 of FIG. 7. It will be appreciated that the exemplary gas turbine engine 10 and thermal management system 100 of FIGS. 7 and 8 are configured in substantially the same manner as exemplary gas turbine engine 10 and thermal management system 100 described above with reference to FIG. 2. Accordingly, the same or similar numbers may refer to same or similar parts.

For example, as will be appreciated, the thermal management system 100 of FIGS. 7 and 8 generally includes a flowpath heat exchanger coupled to, or integrated into, one or more components of the compressor section, the combustion section 26, the turbine section, or the exhaust section 32 such that the flowpath heat exchanger is directly thermally coupled to an airflow 64 through the core air flowpath 37. More specifically, the exemplary thermal management system 100 generally includes a heat sink heat exchanger 108, a thermal transport bus 102, and a heat source heat exchanger 106.

However, for the embodiment depicted, the flowpath heat exchanger is instead configured as the heat sink heat exchanger 108 of the thermal management system 100. In such a manner, the flowpath heat exchanger/heat sink heat exchanger 108 is operable to receive heat from the heat source heat exchanger 106 from/through the thermal transport bus 102, and transfer such heat to the airflow 64 through the core air flowpath 37. Notably, for the embodiment depicted, the heat source heat exchanger 106 is a waste heat recovery heat exchanger thermally coupled to the turbine section, exhaust section 32, or both. More specifically, for the embodiment depicted, the turbine section includes an outlet guide vane 138 positioned downstream of an LP turbine 30. The heat source heat exchanger 106 is coupled to, or integrated into the outlet guide vane 138 within the turbine section for removing heat from the airflow 64 through the core air flowpath 37 at a location downstream of the LP turbine 30 (notably, the airflow 64 is predominately combustion gas 66 at this stage; see FIG. 8). In such a manner, the heat source heat exchanger 106 may recover otherwise waste heat from the airflow 64 through the core air flowpath 37. It will be appreciated, however, that in other embodiments, the waste heat recovery heat exchanger/heat source heat exchanger 106 may instead be positioned in the LP turbine 30 or HP turbine 28, e.g., integrated into one or more turbine stator vanes positioned therein.

Moreover, as is depicted, the combustion section 26 includes a plurality of fuel nozzles 122. The plurality of fuel nozzles 122 are generally configured to receive a fuel flow from the fuel delivery system 120, and provide a mixture of fuel and air to a combustion chamber 124 where such mixture may be burned or combusted to generate combustion gases 66 to power the turbine section. Referring particularly to FIG. 8, it will be appreciated that for the embodiment depicted, the flowpath heat exchanger/heat sink heat exchanger 108 is coupled to, or integrated into at least one of the plurality of fuel nozzles 122. More specifically, for the embodiment depicted, the flowpath heat exchanger/heat sink heat exchanger 108 is coupled to, or integrated into, a surface 140 of at least one of the plurality of fuel nozzles 122 such that the flowpath heat exchanger is directly exposed to the airflow 64 through the core air flowpath 37 (similar to how the flowpath heat exchanger is integrated into the surface 130 of the exemplary heat transfer member 118 of FIG. 3). In such a manner, the flowpath heat exchanger is operable to transfer heat directly to the airflow 64 through the core air flowpath 37 from, e.g., the heat source heat exchanger 106 through the thermal transport bus 102.

It will be appreciated that in certain exemplary embodiments, the flowpath the exchanger may include a plurality flowpath heat exchangers coupled to each of the plurality of fuel nozzles 122. Further, by adding heat to the airflow 64 through the core air flowpath 37 at a location directly upstream of the combustion chamber 124 of the combustion section 26, the thermal management system 100 may allow for a more efficient combustion within the combustion section 26. More specifically, by heating the airflow prior to such airflow being utilized for combustion, more complete combustion may take place.

Figure 9:
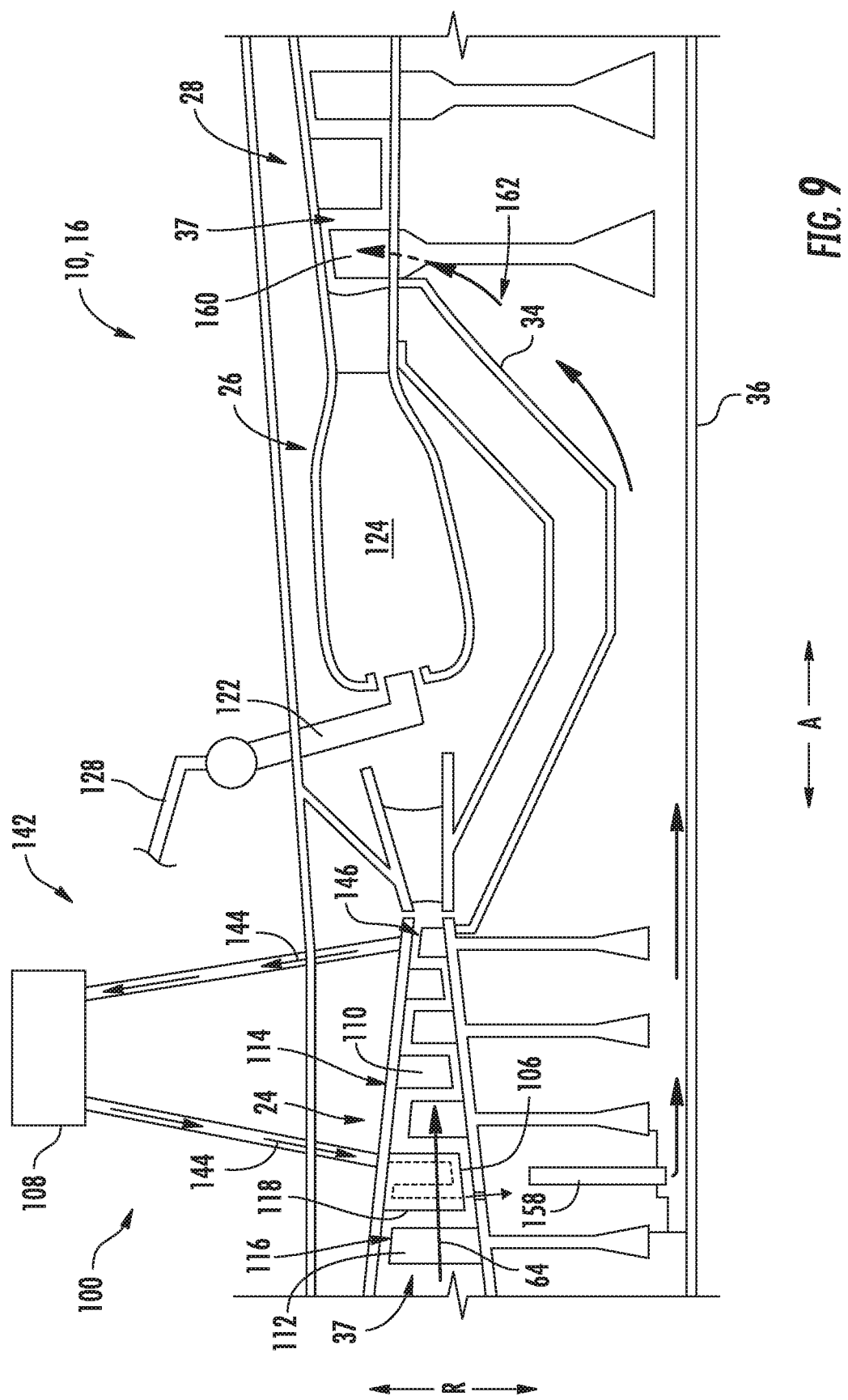
FIG. 9 is a simplified, schematic view of a thermal management system in accordance with still another exemplary embodiment of the present disclosure.

Referring now to FIGS. 9 and 10, it will be appreciated that in still other embodiments of the present disclosure, the gas turbine engine 10 and thermal management system 100 included therein may have still other suitable configurations. FIG. 9 is a schematic, cross-sectional view of a section of a gas turbine engine 10 including a thermal management system 100 in accordance with another exemplary embodiment of the present disclosure; and FIG. 10 is a close-up, cross-sectional view of a portion of the exemplary compressor and thermal management system 100 of FIG. 9. It will be appreciated that the exemplary gas turbine engine 10 and thermal management system 100 of FIGS. 9 and 10 may be configured in substantially the same manner as exemplary gas turbine engine 10 and thermal management system 100 described above with reference to FIG. 2. Accordingly, the same or similar numbers may refer to same or similar parts.

For example, as will be appreciated, the thermal management system 100 of FIGS. 9 and 10 generally includes a flowpath heat exchanger coupled to, or integrated into, one or more components of the compressor section, the combustion section 26, the turbine section, or the exhaust section 32 such that the flowpath heat exchanger is directly thermally coupled to an airflow 64 through the core air flowpath 37. More specifically, for the embodiment depicted, the flowpath heat exchanger is configured as a heat source heat exchanger 106 of the thermal management system 100 positioned within a compressor of the compressor section, and more specifically, positioned within the HP compressor 24 of the compressor section. In such a manner, the flowpath heat exchanger/heat source heat exchanger 106 is operable to transfer heat from the airflow 64 through the core air flowpath 37 to reduce a temperature of the airflow 64 through the core air flowpath 37 of the turbomachine 16, and more specifically, to reduce a temperature of the airflow through a portion of the core air flowpath 37 defined by the HP compressor 24.

Further, for the embodiment depicted the gas turbine engine 10 includes a cooled cooling air system 142. The cooled cooling air system 142 is configured to provide cooling air to the turbine section to reduce a temperature of one or more components of the turbine section. More particularly, for the embodiment depicted, the thermal management system 100 is configured with the cooled cooling air system 142 to provide (and more particularly to cool) the cooled cooling airflow for the cooled cooling air system 142. As is depicted, the thermal management system 100 is configured to receive a high pressure airflow 144 from a relatively high pressure airflow source 146. For the embodiment depicted, the high pressure airflow source 146 is a downstream end of an HP compressor 24 of the compressor section. The thermal management system 100 transfers the high pressure airflow 144 received from the high pressure airflow source 146 to a heat sink heat exchanger 108 of the thermal management system 100. The heat sink heat exchanger 108 is configured to transfer heat from the high pressure airflow 144 received from the high pressure airflow source 146 to cool such high pressure airflow 144. For the embodiment depicted, the heat sink heat exchanger 108 may be a bypass airflow heat exchanger coupled to, or integrated into, one or more components exposed to a bypass airflow passage of the gas turbine engine 10, such as an outlet guide vane the gas turbine engine 10 (see FIG. 2). However, in other embodiments, the heat sink heat exchanger 108 may instead be any other suitable heat sink heat exchanger 108.

The cooled high pressure airflow 144 from the heat sink heat exchanger 108 is then provided to the flowpath heat exchanger/heat source heat exchanger 106. In such a manner, it will be appreciated that the heat sink heat exchanger 108 is in airflow communication with the flowpath heat exchanger/heat source heat exchanger 106 at a location upstream of the flowpath the exchanger/heat source heat exchanger 106. The high pressure airflow 144 through the flowpath heat exchanger/heat source heat exchanger 106 accepts an amount of heat from the airflow 64 through the core air flowpath 37, reducing a temperature of the airflow 64 through the core air flowpath 37 and increasing a temperature of the high pressure airflow 144 through the flowpath heat exchanger/heat source heat exchanger 106. Notably, although the high pressure airflow 144 through the flowpath heat exchanger/heat source heat exchanger 106 is increasing in temperature, it may still remain cool enough to cool the various components of the turbine section, discussed below. It will also be appreciated that both the flowpath heat exchanger/heat source heat exchanger 106 and heat sink heat exchanger 108 of the thermal management system 100 are each configured as air-to-air heat exchangers.

Referring particularly to FIG. 10, it will be appreciated that for the embodiment depicted, the flowpath heat exchanger/heat source heat exchanger 106 is integrated into a heat transfer member 118 of the compressor section. The exemplary heat transfer member 118 may be configured in a similar manner as the exemplary heat transfer member 118 described above with reference to FIGS. 2 through 4. For example, the exemplary heat transfer member 118 of FIG. 10 may define a maximum chord length 132 (see FIG. 3) greater than a maximum chord length 134 of the plurality of compressor stator vanes 110 of the HP compressor 24 (see FIG. 4).

However, for the embodiment depicted, the exemplary heat transfer member 118 instead includes an air-to-air heat exchanger (i.e., the flowpath heat exchanger/heat source heat exchanger 106) defining an inlet 150 and an outlet 152. Notably, for the embodiment depicted, the HP compressor 24 further defines a low stage bleed port 154 and a high stage bleed port 156. The low stage bleed port 154 may be configured to receive bleed air from a location within the HP compressor 24 forward of/upstream of the inlet 150 to the flowpath heat exchanger/heat source heat exchanger 106. Additionally, the high stage bleed port 156 may be configured to receive bleed air from a location within the HP compressor 24 aft of/downstream of the inlet 150 to the flowpath heat exchanger/heat source heat exchanger 106. In such a manner, it will be appreciated that the inlet 150 of the flowpath heat exchanger/heat source heat exchanger 106 is positioned forward of the high stage bleed port 156 and aft of the low stage bleed port 154.

In addition, the flowpath heat exchanger/heat source heat exchanger 106 is integrated into the heat transfer member 118 of FIG. 10, and as stated, further defines the outlet 152. The inlet 150 is positioned to receive, as discussed above, high pressure airflow 144 from the heat sink heat exchanger 108 of the thermal management system 100 at a location outward of the core air flowpath 37 along the radial direction R, and the outlet 152 is positioned to provide the high pressure airflow 144 to a flowpath located inward of the core air flowpath 37 along the radial direction R.

As is shown, for the embodiment depicted the flowpath heat exchanger defines a serpentine path through the heat transfer member 118, which may increase an amount of heat exchange with the airflow 64 through the core air flowpath 37. Notably, for the embodiment depicted, the inlet 150 is spaced from the outlet 152 along the axial direction A of the gas turbine engine 10, and more specifically, the outlet 152 is positioned forward of the inlet 150 along the axial direction A of the gas turbine engine 10. More specifically still, for the embodiment depicted, the inlet 150 is positioned proximate to an aft end of the heat transfer member 118 and the outlet 152 is positioned proximate to a forward end of the heat transfer member 118. It will be appreciated, that as used herein, the term "proximate to," with reference to an end of the component, refers to being closer to such end than an opposite end.

As stated, the outlet 152 is configured to provide the high pressure airflow 144 to a flowpath located inward of the core air flowpath 37 along the radial direction R. More specifically, for the embodiment depicted, the gas turbine engine 10, or more specifically, the cooled cooling air system 142 of the gas turbine engine 10, further includes an airflow receiver for receiving the high pressure airflow 144 from the outlet 152 and directing such airflow aft to the turbine section. For the embodiment depicted, the airflow receiver is configured as a vortex tube 158, the vortex tube 158 positioned inward of the outlet 152 of the flowpath heat exchanger/heat source heat exchanger 106 to receive the high pressure airflow 144 from the flowpath heat exchanger/heat source exchanger 106. Notably, in certain embodiments, the airflow receiver of the cooled cooling air system 142 may further include a plurality of vortex tubes 158 spaced along the circumferential direction C of the gas turbine engine 10.

Referring now back also to FIG. 9, it will be appreciated that the turbine section includes a turbine having a plurality of turbine rotor blades. More specifically, for the embodiment of FIG. 9, the turbine is an HP turbine 28 having a plurality of HP turbine rotor blades 160. The HP turbine 28, as is shown schematically, defines a cooling air flowpath 162 for providing the high pressure airflow 144 received from the flowpath heat exchanger/heat source heat exchanger 106, and further from the vortex tube 158, to at least one of the plurality of HP turbine rotor blades 160. In such a manner, it will be appreciated that the cooled cooling air flowpath 162 is in airflow communication with the outlet 152 of the flowpath heat exchanger/heat source heat exchanger 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
a turbomachine comprising a compressor section, a combustion section, a turbine section, and an exhaust section arranged in serial flow order and together defining at least in part a core air flowpath; and
a thermal management system comprising a flowpath heat exchanger coupled to, or integrated into, one or more components of the compressor section, the flowpath heat exchanger positioned in the compressor section in place of a stator stage between two rotor stages such that the flowpath heat exchanger is directly thermally coupled to an airflow through the core air flowpath, the two rotor stages being coupled via a common spool,
wherein the compressor section comprises a compressor with a heat transfer member and a row of compressor stator vanes one stage upstream of the heat transfer member, wherein the flowpath heat exchanger is coupled to, or integrated into, the heat transfer member, wherein the row of compressor stator vanes one stage upstream of the heat transfer member defines a maximum chord length, wherein the heat transfer member defines a maximum chord length, wherein the maximum chord length of the heat transfer member is greater than the maximum chord length of the row of compressor stator vanes one stage upstream of the heat transfer member.

2. The gas turbine engine of claim 1, wherein the flowpath heat exchanger is configured as a heat source heat exchanger for removing heat from the airflow through the core air flowpath.

3. The gas turbine engine of claim 2, wherein the maximum chord length of the heat transfer member is at least about 10 percent greater than the maximum chord length of the row of compressor stator vanes one stage upstream of the heat transfer member.

4. The gas turbine engine of claim 2, wherein the compressor is a high pressure compressor.

5. The gas turbine engine of claim 1, wherein the flowpath heat exchanger is positioned on a surface of the one or more components of the compressor section such that the flowpath heat exchanger is directly exposed to the airflow through the core air flowpath.

6. The gas turbine engine of claim 1, wherein the thermal management system further comprises a heat sink heat exchanger and a thermal transport bus, wherein the heat source heat exchanger and heat sink heat exchanger are each fluidly coupled to the thermal bus such that the heat source heat exchanger is operable to transfer heat to the heat sink heat exchanger through the thermal bus.

7. A gas turbine engine comprising:
a turbomachine comprising a compressor section defining at least in part a core air flowpath, the compressor section comprising a heat transfer member and a compressor having a row of compressor stator vanes one stage upstream of the heat transfer member; and
a thermal management system comprising a flowpath heat exchanger coupled to, or integrated into, the heat transfer member of the compressor section, the flowpath heat exchanger positioned in the compressor section in place of a stator stage between two rotor stages such that the flowpath heat exchanger is thermally coupled to an airflow through the core air flowpath, the two rotor stages being coupled via a common spool;
wherein the row of compressor stator vanes defines a maximum chord length, wherein the heat transfer member defines a maximum chord length, wherein the maximum chord length of the heat transfer member is greater than the maximum chord length of the row of compressor stator vanes one stage upstream of the heat transfer member.

* * * * *